United States Patent Office 2,957,885
Patented Oct. 25, 1960

2,957,885

AMINOSUBSTITUTED HETEROCYCLIC COMPOUNDS

Newman M. Bortnick, Oreland, and Marian F. Fegley, Mont Clare, Pa., assignors to Rohm & Haas Company, Philadelphia, Pa., a corporation of Delaware No Drawing. Filed May 14, 1958, Ser. No. 735,104

18 Claims. (Cl. 260—309)

This invention deals with animosubstituted heterocyclic compounds. It also deals with a method for the preparation of these aminosubstituted heterocyclic compounds.

The compounds of this invention are prepared by reacting a specific heterocyclic compound with an amine having the formula $R_5NH_2$ in a substantially equimolecular ratio, to be more fully explained hereinafter. The heterocyclic compounds used as reactants may be represented by the formula $$\begin{array}{c} R_2 \quad R_3 \\ \diagdown \diagup R_4 \\ R_1 - \\ N \diagdown \diagup N \\ Q \end{array}$$

The products of this invention may be represented by the formula $$\begin{array}{c} R_2 \quad R_3 \\ \diagdown \diagup R_4 \\ R_1 - \\ R_5NH \diagdown N \diagup N \\ Q \end{array}$$

The symbol $R_1$ represents hydrocarbon groups of one to ten carbon atoms, preferably alkyl, aralkyl, cycloalkyl, aryl, and alkaryl. The symbol $R_2$ represents a hydrogen atom or an alkyl group of one to four carbon atoms. The symbols $R_3$ and $R_4$ may be hydrogen atoms or hydrocarbon groups containing from one to ten carbon atoms including alkyl, aralkyl, cycloalkyl, aryl, and alkaryl groups. In addition, $R_1$ and $R_2$ taken together with the carbon atoms to which they are joined may form a carbocyclic ring containing five to six carbon atoms which in turn may have alkyl substituents containing a total of no more than four additional carbon atoms. In addition, $R_2$ and $R_3$ taken together with the carbon atoms to which they are joined may form a carbocyclic ring containing five to six carbon atoms which in turn may have alkyl substituents containing a total of no more than four additional carbon atoms. In addition, $R_3$ and $R_4$ when taken together with the carbon atom to which they are joined may form a carbocyclic ring containing five to six carbon atoms which in turn may have alkyl substituents containing a total of no more than four additional carbon atoms. The total number of carbon atoms in the ketonitrile should not exceed 24. The preferred embodiments are those in which $R_1$ and $R_4$ are alkyl groups, $R_2$ is a hydrogen atom, and $R_3$ is a methyl group. $R_1$, $R_3$, and $R_4$ may typically individually represent methyl, butyl, octyl, benzyl, phenylbutyl, cyclopentyl, cyclohexyl, phenyl, naphthyl, butylphenyl groups, and the like.

The symbol $R_5$ represents a hydrogen atom, an alkyl group of one to eighteen carbon atoms, an alkenyl group of three to eighteen carbon atoms, an aralkyl group of up to eighteen carbon atoms, an alkarylalkyl group of up to thirty carbon atoms, an alkoxyalkyl group of three to twenty-four carbon atoms, a hydroxyalkyl group of two to twelve carbon atoms, and an aminoalkyl or alkylaminoalkyl group of three to eighteen carbon atoms. The symbol $R_5$ may also represent a divalent chain that may form with the nitrogen atom a cyclic secondary amino structure. Alkyl, in the above definition, is to be construed to include cycloalkyl and alkylcycloalkyl within the range of carbon atoms previously set forth.

The symbol Q represents a chain of two to three carbon atoms between the two nitrogen atoms to which it is joined. Q may be a straight chain alkylene group, an alkyl-substituted alkylene group, or a cycloalkyl, aryl or aralkyl group as long as there are no more than two to three carbon atoms between the two primary amino groups. While the upper limit of the carbon atoms in Q is not especially critical, about 18 is considered the practical upper limit. Also, while the group Q may contain alkyl substituents, it is necessary that the carbon atom directly attached to the amino nitrogen atom be attached to no more than two carbon atoms. Typical representations of the Q group include $$-CH_2CH_2-$$
$$-CH_2CH_2CH_2-$$
$$-CHCH_2-$$
$$\quad\;|$$
$$\quad CH_3$$
$$-CH_2CHCH_2-$$
$$\qquad\;|$$
$$\qquad C_4H_9$$
$$-CH_2CH_2CH-$$
$$\qquad\qquad|$$
$$\qquad\qquad C_3H_7$$
$$-CH_2CHCH_2-$$
$$\qquad\;|$$
$$\qquad C_8H_{17}$$
$$-CHCH_2-$$
$$\;\;|$$
$$\;\;C_4H_9$$
$$-CHCH_2CH-$$
$$\;\;|\qquad\quad|$$
$$\;\;C_8H_{17}\;\;C_5H_{11}$$

[cyclohexylene]

[phenylene]

[phenylene with $C_8H_{17}$]

[cyclopentylene with $C_4H_9$]

and $$\qquad\quad C_4H_9$$
$$\qquad\quad|$$
$$-CH-CH-CH-$$
$$\;\;|\qquad\qquad|$$
$$\;\;C_3H_7\qquad C_2H_5$$

In the reactant $R_5NH_2$, the —$NH_2$ group must be attached either to a hydrogen atom or to a carbon atom that is in turn attached to no more than two other carbon atoms. Typical $R_5$ representations are hydrogen, methyl, ethyl, butyl, octyl, decyl, dodecyl, octadecyl, cyclopentyl, cyclohexyl, butylcyclohexyl, octylcyclohexyl, butylcyclohexylethyl, propenyl, butenyl, hexenyl, octenyl, decenyl, dodecenyl, octadecenyl, benzyl, phenylethyl, phenylbutyl, phenyldodecyl, methylbenzyl, ethylbenzyl, butylbenzyl, octylbenzyl, dodecylbenzyl, butylphenylbutyl, octylphenylethyl, dioctylphenylethyl, dodecylphenyloctyl, methoxyethyl, methoxypropyl, methoxyhexyl, methoxydecyl, methoxyoctadecyl, ethoxyethyl, ethoxybutyl, ethoxyoctyl, ethoxydodecyl, propoxyethyl, propoxybutyl, propoxyheptyl, propoxytetradecyl, butoxyethyl, butoxybutyl, butoxyoctyl, butoxydodecyl, butoxyoctadecyl, pentoxyethyl, pentoxybutyl, pentoxydecyl, hexoxyethyl, hexoxyhexyl, hexoxydodecyl, hexoxyoctadecyl, heptoxyethyl, heptoxyoctyl, octoxyethyl, octoxybutyl, octoxyoctyl, octoxydodecyl, nonoxypropyl, nonoxyheptyl, nonoxytridecyl, decoxyethyl, decoxyoctyl, undecoxybutyl, dodecoxypropyl, dodecoxydecyl, dodecoxydodecyl, tridecoxyethyl, tetradecoxypropyl, pentadecoxypentyl, hexadecoxybutyl, heptadecoxyethyl, octadecoxyethyl, octadecoxyhexyl, hydroxyethyl, hydroxypropyl, hydroxybutyl, hydroxypentyl, hydroxyoctyl, hydroxydecyl, hydroxydodecyl, ethylaminoethyl, propylaminoethyl, butylaminopropyl, hexylaminooctyl, heptylaminopentyl, octylaminooctyl, nonylaminoethyl, ethylaminononyl, decylaminopropyl, propylaminododecyl, dodecylaminoethyl, dodecylaminobutyl, dodecylaminohexyl, N-methyl-N-ethylaminoethyl, N-propyl-N-ethylaminoethyl, N-butyl-N-pentylaminoethyl, N-octyl-N-hexylaminobutyl, N-decyl-N-butylaminobutyl, aminoethyl, aminobutyl, and aminooctyl.

Illustrative reactants having the formula $R_5NH_2$ are ammonia, methylamine, butenylamine, benzylamine, ethylbenzylamine, dodecylphenylpropylamine, ethoxybutylamine, ethanolamine, ethylene diamine, pyrrolidine, and α-dimethylaminopropylamine. It should be noted that the reactant $R_5NH_2$ may possess more than one amino group. Also, for the purposes of this invention, ammonia is equivalent to the defined primary monoamines and is included within the compass of this invention. Typical heterocyclic reactants are 2,3-dihydro-5,7,7-trimethyl-(7H)-imidazo[1,2-a]pyrrole,
2,3-dihydro-5,6-dimethyl-(7H)-imidazo[1,2-a]pyrrole,
2,3-dihydro-5,7-dimethyl - 7 - hexyl-(7H)-imidazo[1,2-a]pyrrole,
7-methyl-5,7-bis(2-methylpropyl) - 2,3 - dihydro-(7H)-imidazo[1,2-a]pyrrole,
2,3-dihydro - 5,7 - dimethyl-7-(2,2-dimethylpropyl)-(7H)-imidazo[1,2-a]pyrrole,
2,3-dihydro-2, (or 3),5,7,7-tetramethyl-(7H)-imidazo[1,2-a]pyrrole,
2(or 3),5 - dimethyl - 5,7 - diphenyl - 2,3 - dihydro-(7H)-imidazo[1,2-a]pyrrole,
2(or 3),5-dimethyl - 2,3,7,8,9,9a - hexahydro - (6H)-isoindolo[1-2-a]imidazole,
spiro{3,3-dimethylbicyclo(2.2.1)heptane - 2,7'[2'(or 3')-5'-dimethyl - 2',3' - dihydro - (7'H) - imidazo[1,2-a]pyrrole]},
2(or 3),7,9,9-tetramethyl - 2,3,5,6,7,8 - hexahydro-(9H)-indolo[1,2-a]imidazole,
6,8,8 - trimethyl - 2,3,4,8 - tetrahydropyrrolo[1,2-a]pyrimidine,
spiro{cyclohexane-1,10'-[2',3',4',6',7',8',9',10'-octahydroindolo[1,2-a]pyrimidine]},
6-methyl - 2,3,4,7,8,9,10,10a - octahydroisoindolo[1,2-a]pyrimidine, and
6,8 - dimethyl - 8 - (2,2-dimethylpropyl)-2,3,4,8-tetrahydropyrrolo[1,2-a]pyrimidine.

These heterocyclic reactants may be prepared according to the method shown in our copending application Serial No. 718,504, filed March 3, 1958.

The present products are formed by reacting an equivalent of the defined iminopyrroline reactant with substantially an equivalent of the defined primary monoamine reactant. Generally, it is advisable to employ the amine reactant in excess of the amount required in order to assure completeness of reaction and maximum yields. The reaction temperature ranges from about 0° to somewhat below 75° C., such as 70° C. preferably about 20° to 60° C. The reaction may be conducted in the presence of an inert volatile organic solvent, such as benzene, toluene, xylene, heptane, hexane, methylene chloride, chloroform, and the like. The product formed is frequently crystalline in nature and may be separated by filtration and purified by recrystallization from a suitable solvent, such as the hydrocarbon solvents, as desired.

The course and completeness of the reaction is readily followed by use of the infra-red absorption spectra, and it has been repeatedly observed that infra-red bands characteristic of the reactants disappear as the reaction reaches completion. This is frequently a valuable aid in determining the rate and extent of the present reaction as will be apparent to one skilled in the art.

While the present reaction is consummated by a mere mixing of the selected reactants, it is frequently advantageous to add from 0.1 to 10.0 mole percent of an acid in order to expedite the reaction. This acid may be employed as the acid salt of the amine reactant and such is the preferred way. The common laboratory acids are satisfactory, economical and, therefore, preferred in this respect. Suitable for this use are hydrochloric, hydrobromic, sulfuric, and the like, preferably in the form of the salt of the amine reactant.

The products of this invention are valuable fungicides especially when employed against *Stemphylium sarcinaeforme* and *Monilinia fructicola*. In these applications, they are quite effective in concentrations as low as about 0.005% when evaluated according to standard procedures. At the same time, they do not exhibit any appreciable phytotoxicity. Also the products of this invention are useful as hypotensive agents. In this respect, they are useful, in that they do not exhibit untoward side effects. The present products are useful systemic insecticides especially against the bean beetle and the armyworm when employed according to standard methods.

The compounds of this invention have been presented in their free-base form and in this free-base form, they possess the valuable characteristics and concurrent utilities previously referred to. However, it is to be construed that the present invention includes the acid addition salts of these free-base products also. It is desirable, in some instances, to employ the present products in their water-soluble salt form. For instance, in pesticidal applications, it is highly desirable to deal with water-soluble compounds in order that satisfactory spray solutions may be formulated. In other applications, wherein any physiological benefits are desired, it is frequently advantageous to employ the present products in their physiologically acceptable organic salt form in order to provide the stability and physiological tolerance required.

In order to prepare the salt forms of the present compounds, it is necessary only to react these compounds with a stoichiometric amount of the selected acid. The salt formation occurs readily at room temperature without the aid of a catalyst. If solids reactants are employed, it may be advantageous to use an inert volatile solvent such as benzene, toluene, xylene, hexane, heptane, methylene chloride, chloroform, or the like. The solvent can then be readily removed at the conclusion of the reaction by conventional methods. The salt product does not require any further purification although recrystallization from a solvent may be resorted to if a product of high purity is demanded.

While it is believed clear to one skilled in the art from the above description how the salts are prepared, such salt formation may be specifically illustrated by indicating that one would take an equivalent amount of a selected compound of the invention, in its free base form, and then add a stoichiometric amount of a selected acid which would for instance be 36.5 parts of hydrochloric acid, 98 parts of sulfuric acid, 60 parts of acetic acid, 72 parts of acrylic acid and the like. The corresponding hydrochloric, sulfuric, acetic, and acrylic acid salts respectively are readily formed. Similarly, other salt products may be prepared.

Typical organic and inorganic acids that may be employed are formic acid, acetic acid, propionic acid, butyric acid, caproic acid, capric acid, lauric acid, myristic acid, palmitic acid, stearic acid, acrylic acid, methacrylic acid, crotonic acid, undecylenic acid, oleic acid, linoleic acid, linolenic acid, ricinoleic acid, propiolic acid, butynoic acid, cyclobutane-carboxylic acid, norcamphane-2-carboxylic acid, benzoic acid, resorcylic acid, oxalic acid, succinic acid, glutaric acid, adipic acid, sebacic acid, salicylic acid, maleic acid, fumaric acid, glutaconic acid, saccharic acid, dodecanedioic acid, octendioic acid, cyclohexaneacetic acid, cyclopentaneacetic acid, tridecanoic acid, hexynedioic acid, phthalic acid, cinnamic acid, benzenesulfonic acid, ethanesulfonic acid, naphthalenesulfonic acid, toluenesulfinic acid, glutamic acid, glyoxalic acid, phenylglyoxalic acid, pyruvic acid, levulinic acid, glycine, aminocaproic acid, hydrochloric acid, hydrobromic acid, sulfuric acid, perchloric acid, carbonic acid, nitric acid, and phosphoric acid.

The compounds of this invention, as well as the methods for their preparation, may be more fully understood from the following examples which are offered by way of illustration and not by way of limitation. Parts by weight are used throughout.

Example 1

Isobutylamine (50 parts) and 2,3-dihydro-5,7,7-trimethyl-(7H)-imidazo[1,2-a]pyrrole (40 parts) are combined and allowed to stand at room temperature for one week. Periodic checks of the refractive index shows that the reaction is taking place very slowly. More isobutylamine (25 parts) is added and the solution is refluxed for 30 hours. Excess isobutylamine is distilled under reduced pressure until the pot temperature rises to 80° C. at 20–30 mm. absolute pressure. The refractive index of the mixture ($n_D^{26}=1.4631$ initially) rises to $n_D^{25}=1.4808$. Analysis of the residue shows that the addition has gone nearly to completion. The product ($C_{13}H_{25}N_3$) has a neutral equivalent of 117.3 (111.7 theoretical) and contains 18.6% nitrogen (18.8 theoretical).

Example 2

When a mixture of 2,3-dihydro-5,7,7-trimethyl-(7H)-imidazo[1,2-a]pyrrole (40 parts), isobutylamine (50 parts), and isobutylamine hydrochloride (0.6 part) are combined and refluxed overnight, the product, after stripping to a pot temperature of 55° C. at 0.1 mm. absolute pressure has an $n_D^{25}$ value of 1.4890, a neutral equivalent of 113.3, and contains 18.4% nitrogen.

Example 3

Ethylene diamine (3 parts) and 2,3-dihydro-5,7,7-trimethyl-(7H)-imidazo[1,2-a]pyrrole (15 parts) are combined and allowed to stand in a stoppered flask. After standing for four weeks, a crystalline solid separates. It is washed with heptane and found to melt at 142° to 154° C. Recrystallization from ethyl acetate gives the pure product having a melting point of 143.5–148° C. in nearly quantitative yield, 1,2-bis{5-[2,3,5,6-tetrahydro-5,7,7-trimethyl-(7H)-imidazo[1,2-a]pyrrolyl]amino} ethane. The same product is obtained when 0.15 gram of ethylenediamine dihydrochloride is added in addition. At 60° C. the reaction is very nearly complete in two hours in the presence of this agent.

Example 4

Secondary amines which have low steric requirements may also be added to these imidazopyrroles. Thus, pyrrolidine (11.4 parts) and 2,3-dihydro-5,5,7-trimethyl-(7H)-imidazo[1,2-a]pyrrole (23 parts) are combined and allowed to stand at room temperature. When no change in refractive index appears after 18 hours, pyrrolidine hydrochloride (0.25 part) is added. The refractive index rises from $n_D^{25}=1.4860$ to $n_D^{25}=1.4888$ within a few minutes and after six hours reaches $n_D^{25}=1.4960$. Examination of the spectrum in the ultraviolet range shows that the band at 242 m$\mu$, which is characteristic of 2,3-dihydro-5,7,7-trimethyl-(7H)-imidazo[1,2-a]pyrrole, has disappeared and is replaced by a much weaker band at approximately 212 m$\mu$, $\epsilon$ max. ca. 5000. The final refractive index of the mixture reaches $n_D^{25}=1.5051$ when the very small amount of excess pyrrolidine is removed by means of a rotating evaporator. The product ($C_{13}H_{23}N_3$) has a neutral equivalent of 115.7 (110.6 theoretical).

When a small portion of this product is distilled under reduced pressure (1.0 mm.), decomposition occurs and the starting materials are isolated in the distillate.

The method of Example 2 is used to prepare 5-laurylamino-2,3,5,6-tetrahydro-5,6-dimethyl-(7H)-imidazo[1,2-a]pyrrole from laurylamine and 2,3-dihydro-5,6-dimethyl-(7H)-imidazo[1,2-a]pyrrole; 5-cyclohexylamino-2,3,5,6-tetrahydro-5,7-dimethyl-7-hexyl-(7H)-imidazo[1,2-a]pyrrole from cyclohexylamine and 2,3-dihydro-5,7-dimethyl-7-hexyl-(7H)-imidazo[1,2-a]pyrrole; 5-benzylamino-2,3,5,6-dihydro-2(or 3),5,7,7-tetramethyl-(7H)-imidazo[1,2-a]pyrrole from benzylamine and 2,3-dihydro-2(or 3),5,7,7-tetramethyl-(7H)-imidazo[1,2-a]pyrrole; 5-(2-vinoxyethyl)-amino-2(or 3),5-dimethyl-2,3,5,5a,7,8,9,9a-octahydro-(6H)-isoindolo[1,2-a]imidazole from 2-vinoxyethylamine and 2(or 3),5-dimethyl-2,3,7,8,9,9a-hexahydro-(6H)-isoindolo[1,2-a]imidazole; and spiro{3,3-dimethylbicyclo(2.2.1)heptane-2,7'[2'(or 3'),5'-dimethyl-5'-(2-butoxyethylamino)-2',3',5',6'-tetrahydro-(7'H)-imidazo[1,2-a]pyrrole]} from 2-butoxyethylamine and spiro{3,3-dimethylbicyclo(2.2.1)heptane-2,7'[2'(or 3'),5'-dimethyl-2',3'-dihydro-(7'H)-imidazo[1,2-a]pyrrole]}. Following the procedure similar to Example 4, 6-methylamino-6,8,8-trimethyl-2,3,4,6,7,8-hexahydropyrrolo[1,2-a]pyrimidine is prepared from monomethylamine and 6,8,8-trimethyl-2,3,4,8-tetrahydropyrrolo[1,2-a]pyrimidine; spiro{cyclohexane-1,10'[5a'-ethylamino-2',3',4',5a',6',7',8',9',9a',10'-decahydroindolo[1,2-a]pyrimidine]} is prepared from ethylamine and spiro{cyclohexane-1,10'[2',3',4',6',7',8',9',10'-octahydroindolo[1,2-a]pyrimidine]}, and 1-butylamino-1,3,3-trimethyl-1,2-dihydro-(3H)-pyrrolo[1,2-a]benzimidazole is prepared from butylamine and 1,3,3-trimethyl-(3H)-pyrrolo[1,2-a]benzimidazole.

We claim:
1. As a composition of matter, a member from the group consisting of the compound having the formula

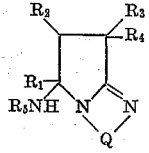

in which $R_1$ taken individually represents a member from the class consisting of alkyl, hydrocarbon aralkyl, cycloalkyl, hydrocarbon aryl, and hydrocarbon alkaryl groups of no more than 10 carbon atoms, $R_2$ taken individually represents a member from the class consisting of a hydrogen atom and an alkyl group of 1 to 4 carbon atoms, $R_3$ and $R_4$ taken individually represent members from the class consisting of hydrogen atoms, alkyl, cycloalkyl, hydrocarbon aralkyl, hydrocarbon aryl, and hydrocarbon alkaryl groups of no more than 10 carbon atoms, $R_1$ and $R_2$ taken collectively with the carbon atoms to which they are joined form a member from the group consisting of a hydrocarbon ring containing 5 to 6 carbon atoms and such a ring containing alkyl substituents with a total of no more than 4 additional carbon atoms in all of said substituents, $R_2$ and $R_3$ taken collectively with the carbon atoms to which they are joined form a member from the group consisting of a hydrocarbon ring containing 5 to 6 carbon atoms and such a ring containing alkyl substituents with a total of no more than 4 carbon atoms in all of said substituents, $R_3$ and $R_4$ taken collectively with the carbon atoms to which they are joined form a member from the group consisting of a hydrocarbon ring containing 5 to 6 carbon atoms and such a ring containing alkyl substituents with a total of no more than 4 additional carbon atoms in all of said substituents, $R_5$ is a member from the class consisting of a hydrogen atom, alkyl groups of 1 to 18 carbon atoms, alkenyl groups of 3 to 18 carbon atoms, hydrocarbon aralkyl groups of up to 18 carbon atoms, hydrocarbon alkarylalkyl groups of up to 30 carbon atoms, alkoxyalkyl groups of 3 to 24 carbon atoms, hydroxyalkyl groups of 2 to 12 carbon atoms, aminoalkyl groups of 3 to 18 carbon atoms, in which the amino group is non-primary in structure, and alkylaminoalkyl groups of 3 to 18 carbon atoms, and Q represents a chain of 2 to 3 carbon atoms between the nitrogen atom to which it is joined, said Q containing up to about 18 carbon atoms.

2. As a composition of matter, the compound having the formula

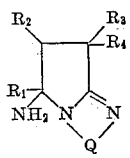

in which $R_1$ is an alkyl group of 1 to 10 carbon atoms, $R_2$ is a hydrogen atom, $R_3$ is an alkyl group of 1 to 10 carbon atoms, $R_4$ is an alkyl group of 1 to 10 carbon atoms, and Q represents an ethylene group.

3. As a composition of matter, the compound having the formula

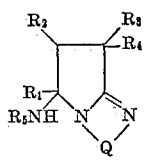

in which $R_1$ is an alkyl group of 1 to 10 carbon atoms, $R_2$ is a hydrogen atom, $R_3$ is an alkyl group of 1 to 10 carbon atoms, $R_4$ is an alkyl group of 1 to 10 carbon atoms, $R_5$ is an alkyl group of 1 to 18 carbon atoms, and Q represents an ethylene group.

4. As a composition of matter, the compound having the formula

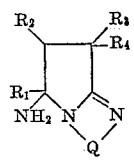

in which $R_1$ and $R_4$ are alkyl groups of 1 to 10 carbon atoms, $R_2$ is a hydrogen atom, and $R_3$ is a methyl group, and Q represents an ethylene group.

5. As a composition of matter, the compound having the formula

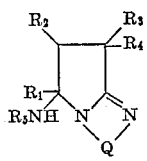

in which $R_1$ and $R_4$ are alkyl groups of 1 to 10 carbon atoms, $R_2$ is a hydrogen atom, and $R_3$ is a methyl group, $R_5$ is an alkyl group of 1 to 18 carbon atoms, and Q represents an ethylene group.

6. As a composition of matter, the compound having the formula

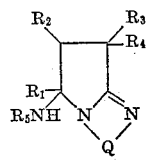

in which $R_1$ and $R_2$ taken collectively with the carbon atoms to which they are joined represent a hydrocarbon ring containing 6 carbon atoms, $R_3$ and $R_4$ are alkyl groups of 1 to 10 carbon atoms, $R_5$ is an alkyl group of 1 to 18 carbon atoms, and Q represents an ethylene group.

7. As a composition of matter, the compound having the formula

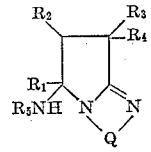

in which $R_1$ is an alkyl group of 1 to 10 carbon atoms, $R_2$ and $R_3$ taken collectively with the carbon atoms to which they are joined form a hydrocarbon ring containing 6 carbon atoms, $R_4$ is an alkyl group of 1 to 10 carbon atoms, $R_5$ is an alkyl group of 1 to 18 carbon atoms, and Q represents an ethylene group.

8. As a composition of matter, the compound having the formula

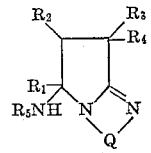

in which $R_1$ is an alkyl group of 1 to 10 carbon atoms, $R_2$ is an alkyl group of 1 to 4 carbon atoms and $R_3$ and $R_4$ taken collectively with the carbon atoms to which they are joined form a hydrocarbon ring containing 6 carbon atoms and Q represents an ethylene group.

9. As a composition of matter, 1,2-bis{5-[2,3,5,6-tetrahydro-5,7,7 - trimethyl - (7H)-imidazo[1,2-a]pyrrolyl] amino}ethane.

10. As a composition of matter, 5-butylamino-2,3,5,6-tetrahydro-5,7,7-trimethyl-(7H) - imidazo[1,2-a]pyrrole.

11. As a composition of matter, 5-benzylamino-2,3,5,6-tetrahydro-2,5,7,7 - tetramethyl - (7H)-imidazo[1,2-a] pyrrole.

12. As a composition of matter, 5-cyclohexylamino-2,3,5,6 - tetrahydro - 5,7-dimethyl-7-hexyl-(7H)-imidazo [1,2-a]pyrrole.

13. As a composition of matter, 1-butylamino-1,3,3-trimethyl-1,2-dihydro-(3H)-pyrrolo[1,2-a]benzimidazole.

14. As a composition of matter, 5-(2-vinoxyethyl)-amino - 2,5 - dimethyl-2,3,5,5a,7,8,9,9a-octahydro-(6H)-isoindolo[1,2-a]imidazole.

15. A method for the preparation of a compound having the formula

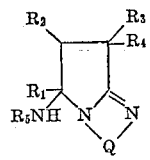

in which $R_1$ taken individually represents a member from the class consisting of alkyl, hydrocarbon aralkyl, cycloalkyl, hydrocarbon aryl, and hydrocarbon alkaryl groups of no more than 10 carbon atoms, $R_2$ taken individually represents a member from the class consisting of a hydrogen atom and an alkyl group of 1 to 4 carbon atoms, $R_3$ and $R_4$ taken individually represent members from the class consisting of hydrogen atoms, alkyl, cycloalkyl, hydrocarbon aralkyl, hydrocarbon aryl, and hydrocarbon alkaryl groups of no more than 10 carbon atoms, $R_1$ and $R_2$ taken collectively with the carbon atoms to which they are joined form a member from the group consisting of a hydrocarbon ring containing 5 to 6 carbon atoms and such a ring containing alkyl substituents with a total of no more than 4 additional carbon atoms in all of said substituents, $R_2$ and $R_3$ taken collectively with the carbon atoms to which they are joined form a member from the group consisting of a hydrocarbon ring containing 5 to 6 carbon atoms and such a ring containing alkyl substituents with a total of no more than 4 carbon atoms in all of said substituents, $R_3$ and $R_4$ taken collectively with the carbon atoms to which they are joined form a member from the group consisting of a hydrocarbon ring containing 5 to 6 carbon atoms and such a ring containing alkyl substituents with a total of no more than 4 additional carbon atoms in all of said substituents, $R_5$ is a member from the class consisting of a hydrogen atom, alkyl groups of 1 to 18 carbon atoms, alkenyl groups of 3 to 18 carbon atoms, hydrocarbon aralkyl groups of up to 18 carbon atoms, hydrocarbon alkarylalkyl groups of up to 30 carbon atoms, alkoxyalkyl groups of 3 to 24 carbon atoms, hydroxyalkyl groups of 2 to 12 carbon atoms, aminoalkyl groups of 3 to 18 carbon atoms, in which the amino group is nonprimary in structure, and alkylaminoalkyl groups of 3 to 18 carbon atoms, and Q represents a chain of 2 to 3 carbon atoms between the nitrogen atom to which it is joined, said Q containing up to about 18 carbon atoms, which comprises bringing together and thereby causing to react in the temperature range of about 0° to 70° C., the compounds having the formulas

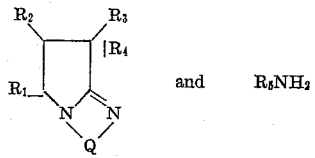

and $R_5NH_2$

16. A method according to claim 15 in which the reaction temperature is about 20° to 60° C.

17. A method according to claim 15 in which the reaction is conducted in the presence of an inert volatile organic solvent.

18. A method according to claim 15 in which the reaction is conducted in the presence of about 0.1 to 10.0 mol percent of an acid.

No references cited.

UNITED STATES PATENT OFFICE
CERTIFICATION OF CORRECTION

Patent No. 2,957,885                                      October 25, 1960

Newman M. Bortnick et al.

It is hereby certified that error appears in the above numbered patent requiring correction and that the said Letters Patent should read as corrected below.

Column 1, lines 25 to 31, the formula should appear as shown below instead of as in the patent:

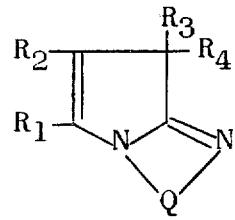

column 6, line 52, before "in which $R_1$" insert -- and the acid addition salts thereof, --; column 10, lines 6 to 12, the formula should appear as shown below instead of as in the patent:

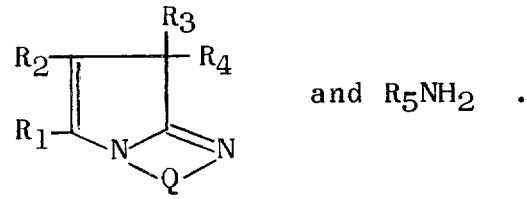

Signed and sealed this 23rd day of May 1961.

(SEAL)
Attest:

ERNEST W. SWIDER
Attesting Officer

DAVID L. LADD
Commissioner of Patents